(12) United States Patent
Ebina et al.

(10) Patent No.: US 11,981,360 B2
(45) Date of Patent: May 14, 2024

(54) SEAT DEVICE

(71) Applicant: KOITO ELECTRIC INDUSTRIES, LTD., Shizuoka (JP)

(72) Inventors: Shunya Ebina, Shizuoka (JP); Yutaka Nagao, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 105 days.

(21) Appl. No.: 17/905,056

(22) PCT Filed: Sep. 16, 2020

(86) PCT No.: PCT/JP2020/035112
§ 371 (c)(1),
(2) Date: Aug. 25, 2022

(87) PCT Pub. No.: WO2021/171665
PCT Pub. Date: Sep. 2, 2021

(65) Prior Publication Data
US 2023/0095735 A1 Mar. 30, 2023

(30) Foreign Application Priority Data
Feb. 28, 2020 (JP) ................. 2020-034279

(51) Int. Cl.
*B60N 2/14* (2006.01)
*B60N 2/06* (2006.01)
*B61D 33/00* (2006.01)

(52) U.S. Cl.
CPC ........... *B61D 33/0085* (2013.01); *B60N 2/06* (2013.01); *B60N 2/14* (2013.01)

(58) Field of Classification Search
CPC ......... B61D 33/0085; B60N 2/06; B60N 2/14
(Continued)

(56) References Cited

U.S. PATENT DOCUMENTS 6,302,483 B1 * 10/2001 Ricaud ............... B61D 33/0085
297/344.22
6,332,648 B1 * 12/2001 Aucheron .......... B61D 33/0085
248/416

(Continued)

FOREIGN PATENT DOCUMENTS

JP 48-22608 U 3/1973
JP H6-32161 U 4/1994
(Continued)

OTHER PUBLICATIONS

International Search Report for PCT/JP2020/035112 dated Dec. 8, 2020 by ISA/JPO.

*Primary Examiner* — Todd M Epps
(74) *Attorney, Agent, or Firm* — Kubotera & Associates, LLC

(57) ABSTRACT

A seat device that can easily and reliably achieve the conversion of the state of a seat. A rotation mechanism (40) that rotates the seat about a rotation axis, a sliding mechanism (14) that advances and retracts the seat together with the rotation mechanism (40) from a fixed side, and a drive mechanism (50) that sequentially and directly drives each of the sliding mechanism (14) and the rotation mechanism (40) are included. The drive mechanism (50) includes a power source (51) provided in the fixed side of the seat, and transmission means for directly driving the sliding mechanism (14) first, and then directly driving the rotation mechanism (40), in a process of converting the state of the seat with power of the power source (51). Here, the transmission means is formed by a sprocket (58) rotated by torque of a motor (51), and many holes (59) with which the sprocket (58) is rotatably engaged to transmit the power.

6 Claims, 14 Drawing Sheets

(58) Field of Classification Search
USPC .............................. 248/425, 429; 296/65.11
See application file for complete search history.

(56) References Cited

U.S. PATENT DOCUMENTS

| | | | |
|---|---|---|---|
| 6,557,919 B2 * | 5/2003 | Suga ...................... | B60N 2/146 |
| | | | 297/344.21 |
| 10,988,051 B2 * | 4/2021 | Kaneko .................. | B61D 33/00 |
| 2019/0241097 A1 | 8/2019 | Kaneko | |
| 2023/0147877 A1 * | 5/2023 | Nakane ................... | B60N 2/14 |
| | | | 297/311 |

FOREIGN PATENT DOCUMENTS

| | | |
|---|---|---|
| JP | H6-32164 U | 4/1994 |
| JP | H08-132935 A | 5/1996 |
| JP | H10-338129 A | 12/1998 |
| JP | 3431772 B2 | 5/2003 |
| JP | 2018-016217 A | 2/2018 |
| JP | 2018-140737 A | 9/2018 |

* cited by examiner

LONG STATE: EARLY STAGE OF SLIDING (ROTATION ANGLE: 0°)

LONG → CROSS: MIDDLE OF SLIDING

LONG → CROSS: MAXIMALLY SLID

ROTATION ANGLE: 30°

ROTATION ANGLE: 60°

ONE CROSS STATE
(ROTATION ANGLE: 90°)

ROTATION ANGLE: 120°

ROTATION ANGLE: 150°

ROTATION ANGLE: 180°

ROTATION ANGLE: 210°

ROTATION ANGLE: 240°

REVERSE CROSS STATE
(ROTATION ANGLE: 270°)

SEAT DEVICE

TECHNICAL FIELD

The present invention relates to a seat device that can convert the state of a seat.

BACKGROUND ART

Conventionally, there are seats of a stool type mounted in, for example, railroad cars, which are long in both directions and can seat a plurality of persons, and are generally installed along walls in cabins. As for this seat, a rotary seat is known that can be rotated about a rotation axis in the center of the seat to convert the orientation between a long state where the back of the seat is parallel to and along a wall, and a cross state where the back of the seat is orthogonal to the wall.

As for such a rotary seat, a seat device has been proposed that includes a sliding mechanism in addition to a rotation mechanism of the seat, and further includes a transmission mechanism for interlocking each mechanism, so that the trajectory (turning radius) of the seat does not interfere with a wall, when rotating the seat from the long state along the wall to the cross state. Refer to Patent Literature 1.

The transmission mechanism interlocks the rotation of the seat with the slide away from the wall, by transmitting the torque of the seat by a motor from the rotation mechanism to the sliding mechanism via a plurality of parts, such as a cam member and an arm. Additionally, the rotation is made from one cross state to a 180 degree opposite cross state, with the sliding of the seat being restrained only by a lock pin.

CITATION LIST

Patent Literature

Patent Literature 1: Japanese Patent No. 3431772

SUMMARY OF THE INVENTION

However, in conventional seat devices, there has been a problem that the transmission mechanism includes a large number of parts and has a complicated configuration, resulting in a high cost. Additionally, since the torque of the seat by the motor is also indirectly utilized for the sliding of the seat via the transmission mechanism, there has been a possibility that the transmission efficiency of power is impaired.

The present invention has been made by focusing on the problems of the related art as described above, and an object of the present invention is to provide a seat device that can reduce costs with a simple configuration, can also improve the transmission efficiency of power, and can easily and reliably convert the state of a seat.

In order to achieve the aforementioned object, in one aspect of the present invention, a seat device that can convert a state of a seat includes
a rotation mechanism that rotates the seat about a rotation axis,
a sliding mechanism that advances and retracts the seat together with the rotation mechanism from a fixed side, and
a drive mechanism that sequentially and directly drives each of the sliding mechanism and the rotation mechanism,
the drive mechanism including a power source provided in the fixed side of the seat, and transmission means for directly driving the sliding mechanism first, and then directly driving the rotation mechanism, in a process of converting the state of the seat with power of the power source.

With the seat device according to the present invention, costs can be reduced with a simple configuration, the transmission efficiency of power can also be improved, and the state of a seat can be easily and reliably converted.

DETAILED DESCRIPTION OF PREFERRED EMBODIMENT

Hereinafter, an embodiment representing the present invention will be described based on the drawings. FIG. 1 to FIG. 21 show one embodiment of the present invention.

A seat device 10 according to the present embodiment can convert the state of a seat. Here, the state of the seat is a concept including not only the orientation of the seat by rotation, but also the change in the front and back position of the seat, etc. Note that, although the kind of the seat is not particularly limited, a case will be described below as an example where the seat is applied to a stool for two persons mounted in a cabin of a railroad car.

<Outline of Seat Device 10>

Figure 1:
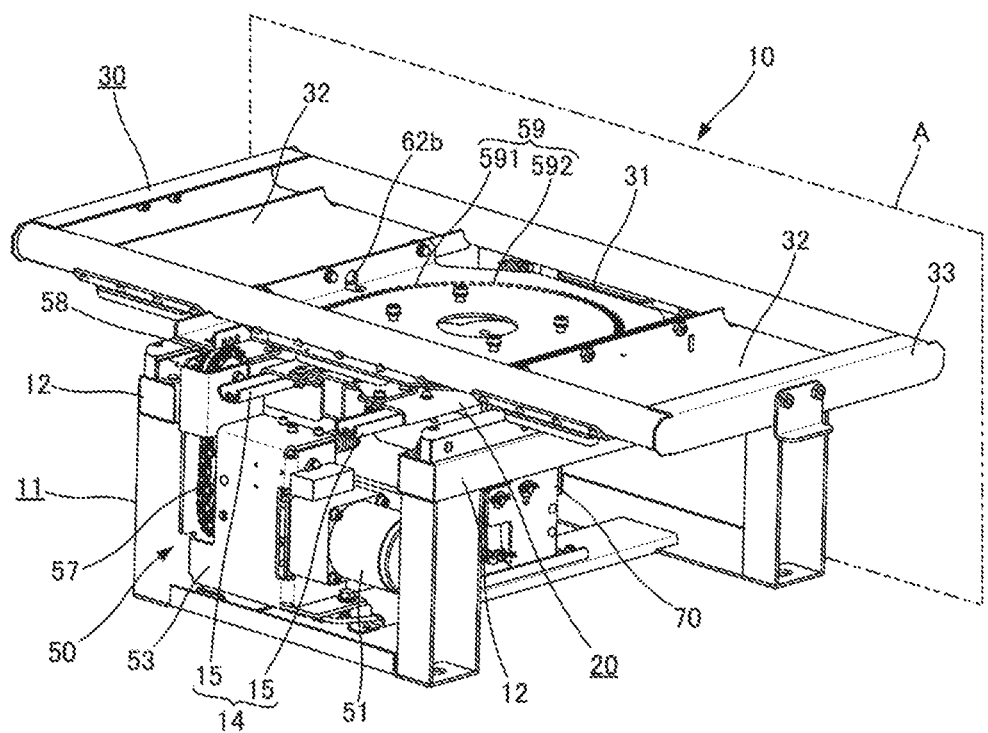
FIG. 1 is a perspective view showing a long state of a seat device according to an embodiment of the present invention.
Figure 2:
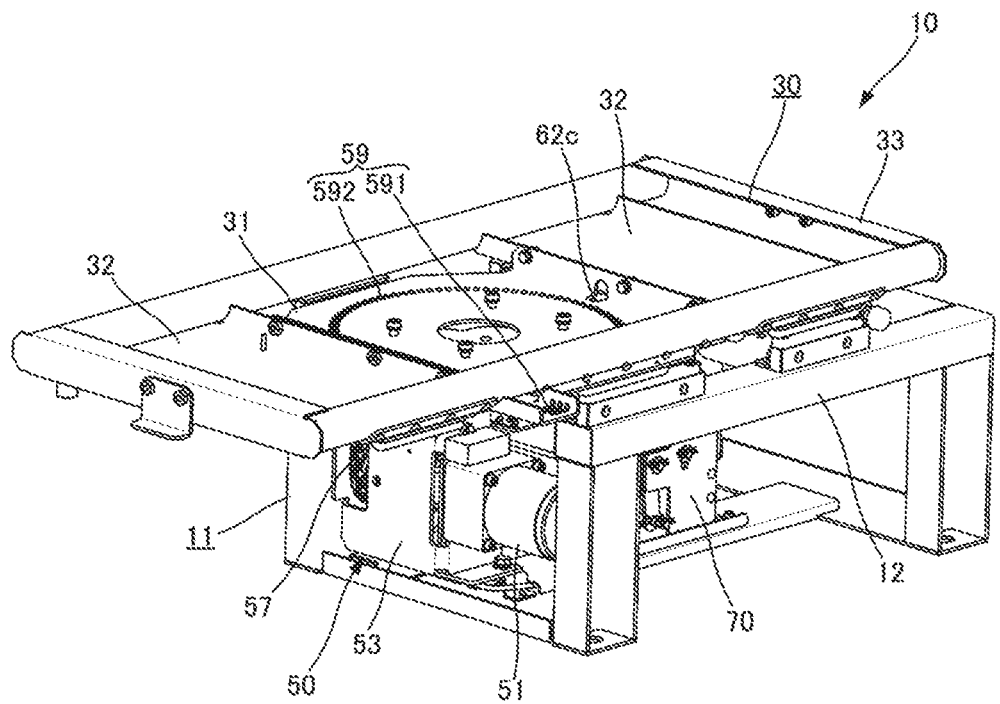
FIG. 2 is a perspective view showing one cross state of the seat device according to the embodiment of the present invention.
Figure 3:
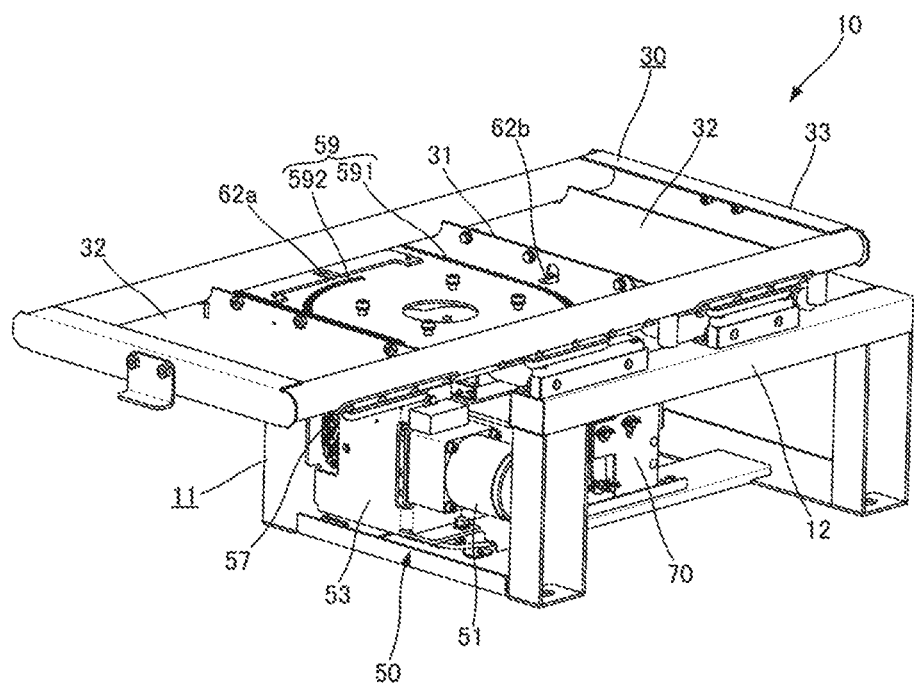
FIG. 3 is a perspective view showing a reverse cross state of the seat device according to the embodiment of the present invention.

As shown in FIG. 1, the seat device 10 includes a leg stand 11 fixed on a floor surface, a movable stand 20 supported by the leg stand 11 so as to be able to advance and retract in front and back directions, and an underframe 30 of the seat supported by the movable stand 20 so as to be rotatable in forward and backward directions. Here, the leg stand 11 corresponds to "a fixed side of the seat", and the movable stand and the underframe 30 correspond to "a movable side of the seat". Note that the seat device 10 is arranged on the floor surface near a wall (window) in the cabin of the railroad car, and "A" in FIG. 1 is a part of the wall parallel to the moving direction of the railroad car.

In the seat device 10, the seat is supported on the movable stand 20 to be rotatable about a rotation axis via the rotation mechanism 40. The movable stand 20 is supported on the leg stand 11 together with the rotation mechanism 40 via a sliding mechanism 14 so as to be able to advance and retract. Additionally, the seat device 10 includes a drive mechanism 50 that sequentially and directly drives each of the sliding mechanism 14 and the rotation mechanism 40. Note that, although an illustration is omitted, the seat itself is formed as, for example, a stool for two persons by arranging two seating portions and backrests side by side in both directions.

<Orientation of Seat>

The seat device 10 according to the present embodiment can convert the state of the seat between a long state (refer to FIG. 1) where the back of the seat is substantially parallel to and along a wall A, and a cross state where the back of the seat is substantially orthogonal to the wall A. Here, for the cross state, there are one cross state (refer to FIG. 2) where the back of the seat is substantially orthogonal to the wall A to face forward, and a reverse cross state (refer to FIG. 3) that is rotated 180 degrees from the one cross state to face backward. When it is assumed that the long state of the seat has a rotation angle of 0 degrees as an original position, the rotation angle of the one cross state is 90 degrees, and the rotation angle of the reverse cross state is 270 degrees. Hereinafter, when collectively referring to the one cross state and the reverse cross state, they are merely written as the cross state.

<Leg Stand 11>

Figure 6:
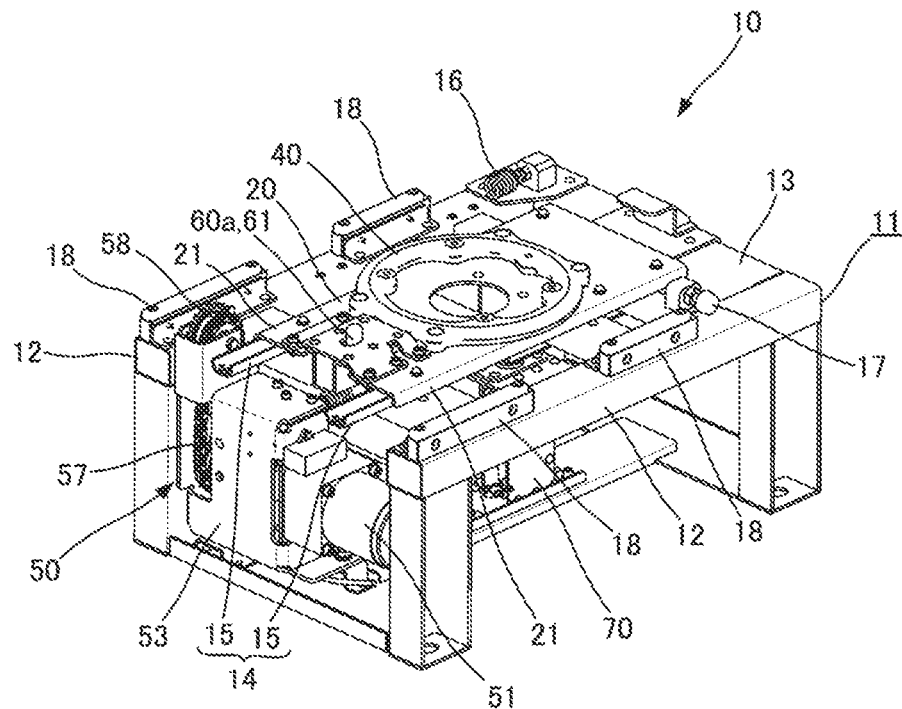
FIG. 6 is a perspective view showing a leg stand and the movable stand of the seat device according to the embodiment of the present invention.

As shown in FIG. 1 and FIG. 6, the leg stand 11 is fixed onto the floor surface near the wall A in the cabin. The leg stand 11 is formed by combining frame members into the shape of a stand that is long in the direction (front and back direction) substantially orthogonal to the wall A. Although an upper surface side of the leg stand 11 is substantially horizontal, and this upper surface side is surrounded by both side ends 12 and 12, forming the long sides, and a rear end portion 13, forming a short side on the rear side (wall A side), the front side (aisle side) is opened. The leg stand 11 is arranged so that the rear end portion 13 is close to and substantially parallel to the wall A, and both side ends 12 and 12 are substantially orthogonal to the wall A and extend toward the aisle side.

As shown in FIG. 6, receiving members 18 for engaging with a bottom surface side of the underframe 30 to prevent rattling when the seat is restrained in each position are provided on the upper side of both side ends 12 and 12. Additionally, in addition to the sliding mechanism 14, which will be described next, related parts such as stoppers 16 and 17 for regulating the advance and retract range and the rotation direction of the underframe 30 are provided on the upper surface side of the leg stand 11, which will be described later. Further, inside the leg stand 11, in a front side (aisle side) where an upper surface side is opened, the component parts of the drive mechanism 50, which will be described later, are also provided.

<Sliding Mechanism 14>

As shown in FIG. 1 and FIG. 6, the movable stand 20 is attached to the upper surface side of the leg stand 11 via the sliding mechanism 14, so as to be able to advance and retract in the directions (front and back directions) substantially orthogonal to the wall A. The sliding mechanism 14 includes a pair of guide rails 15 and 15 provided in the upper surface side of the leg stand 11. The pair of guide rails 15 and 15 are arranged to be parallel to each other between both side ends 12 and 12 of the leg stand 11.

Although an illustration is omitted, each guide rail 15 is fixed to a bracket, etc. protruding toward the inner side of the upper surface side from both side ends 12 and 12. As shown in FIG. 6, parts connected to the movable stand 20, which will be described next, slidably fit into the pair of guides 15 and 15.

<Movable Stand 20>

Figure 7:
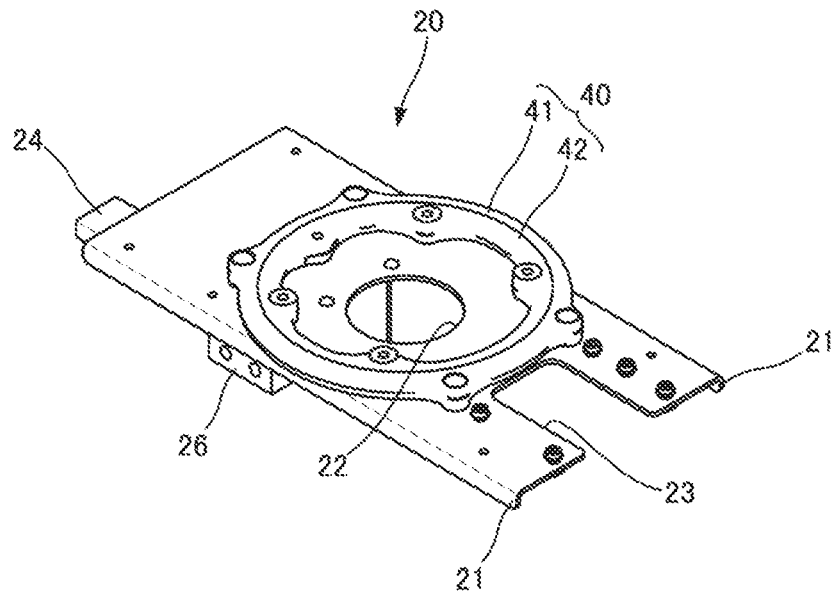
FIG. 7 is a perspective view showing the movable stand of the seat device according to the embodiment of the present invention.
Figure 8:
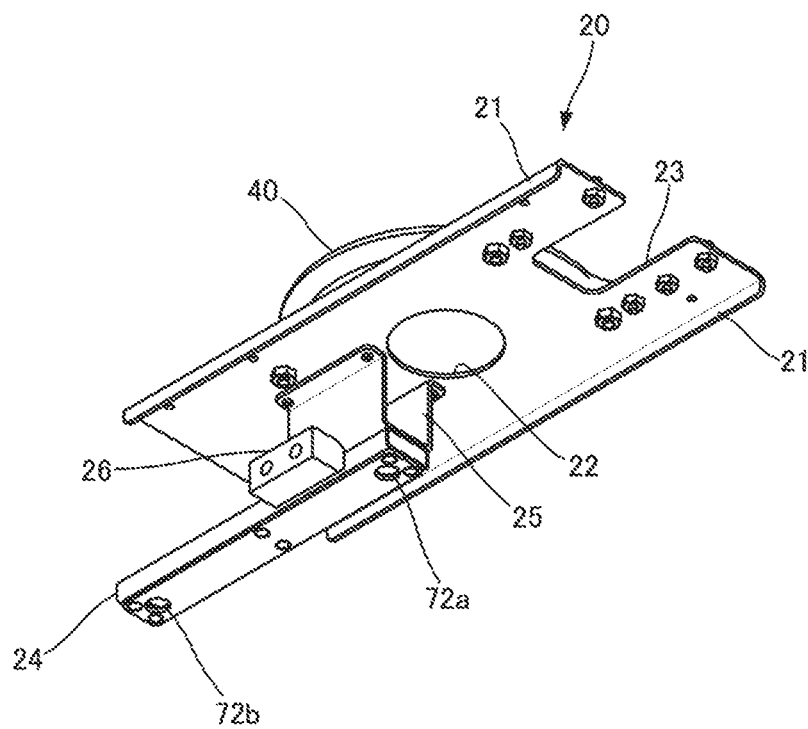
FIG. 8 is a perspective view showing a state where the movable stand of the seat device according to the embodiment of the present invention is seen from the bottom.

As shown in FIG. 7 and FIG. 8, the movable stand 20 is arranged substantially horizontally between both side ends 12 and 12 in the upper surface side of the leg stand 11. The movable stand 20 is formed into, for example, a rectangular plate-like shape from a metal material. Both side ends 21 and 21, forming the long sides of the movable stand 20, are bent downward into flanges.

A circular hole 22 centered on the rotation axis of the seat is formed in the substantially center of the movable stand 20, and the rotation mechanism 40 that rotates the seat about the rotation axis is provided around the circular hole 22 in the upper surface side of the movable stand 20. Additionally, a notch 23 is provided in a front end side of the movable stand 20 so as to recess to the inside thereof, and a rotation lock mechanism 60, which will be described later, is fixed around this notch 23.

A frame member 24 forming a part of an advancement and retraction lock mechanism 70, which will be described later, is fixedly installed to extend in a longitudinal direction in a bottom surface side of the movable stand 20 via a bracket 25. Locking holes 72a and 72b of the advancement and retraction lock mechanism 70, which will be described later, are provided in front and rear ends of the frame member 24. Here, the side at which the frame member 24 is fixed to the bracket 25 is the front end side, and the side extending from the bracket 25 is the rear end side. Additionally, a block-shaped engaged portion 26 to which a stopper 19, which will be described later, is engaged when the seat is advanced most to the aisle side is provided on a side of the frame member 24. Note that a space with which the frame member 24, etc. protruding in the bottom surface side of the movable stand 20 does not interfere at the time of advancement and retraction is provided in the upper surface side of the leg stand 11.

<Rotation Mechanism 40>

The rotation mechanism 40 supports the underframe 30 of the seat on the movable stand 20 so as to be rotatable in the forward and backward directions in a substantially horizontal surface. As shown in FIG. 7, the rotation mechanism 40 is formed as a unit in which a pair of inner and outer ring-shaped turntables 41 and 42 are rotatably combined with each other by interposing a bearing, etc. between them.

As shown in FIG. 7, in the rotation mechanism 40, the outer turntable 41 is fixed to the movable stand 20, and the inner turntable 42 is fixed to the bottom surface side of the underframe 30. Note that the rotation axis, which serves as the rotation center of the seat, is the center line of the inner and outer turntables 41 and 42, and does not have a physical substance in the present embodiment.

<Underframe 30>

Figure 4:
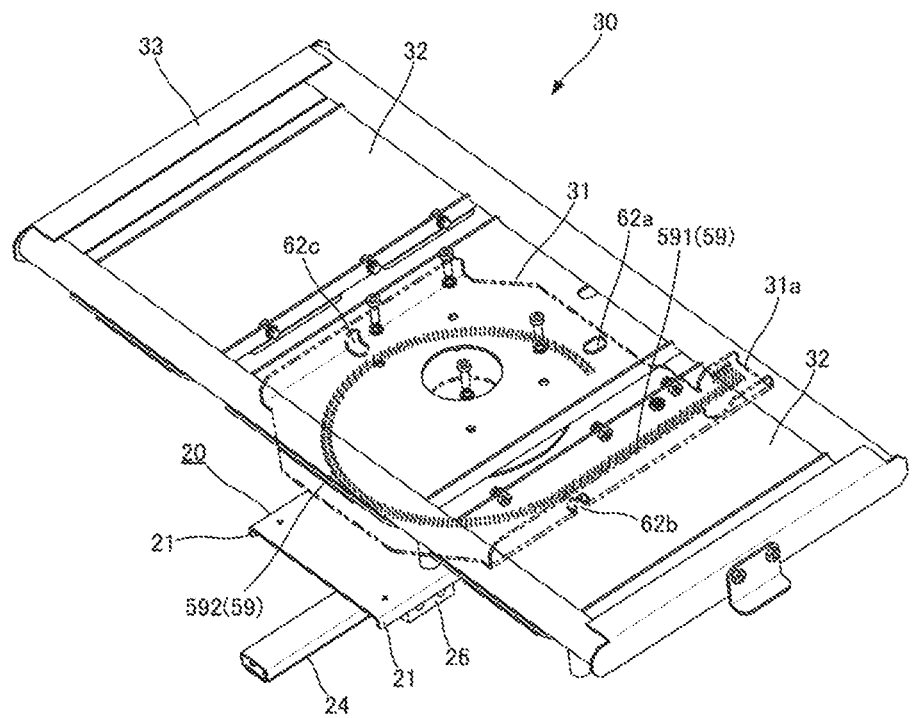
FIG. 4 is a perspective view showing an underframe and a movable stand of the seat device according to the embodiment of the present invention.
Figure 9:
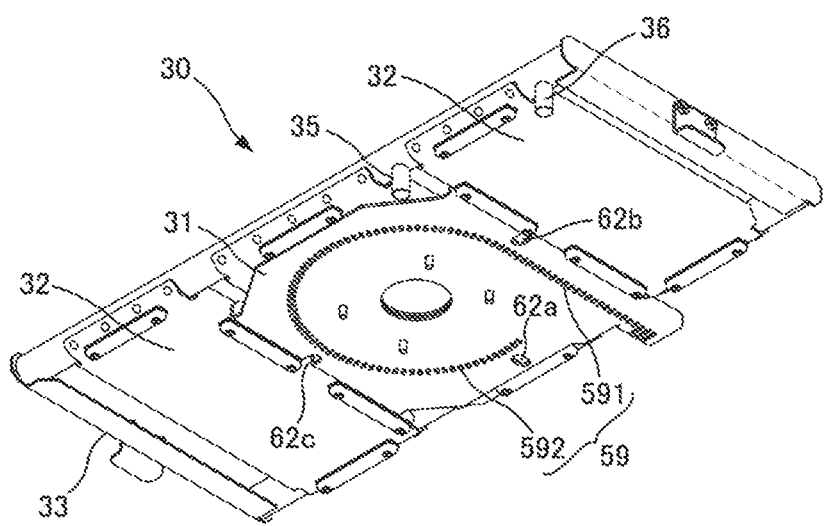
FIG. 9 is a perspective view showing a state where the underframe of the seat device according to the embodiment of the present invention is seen from the bottom.
Figure 10:
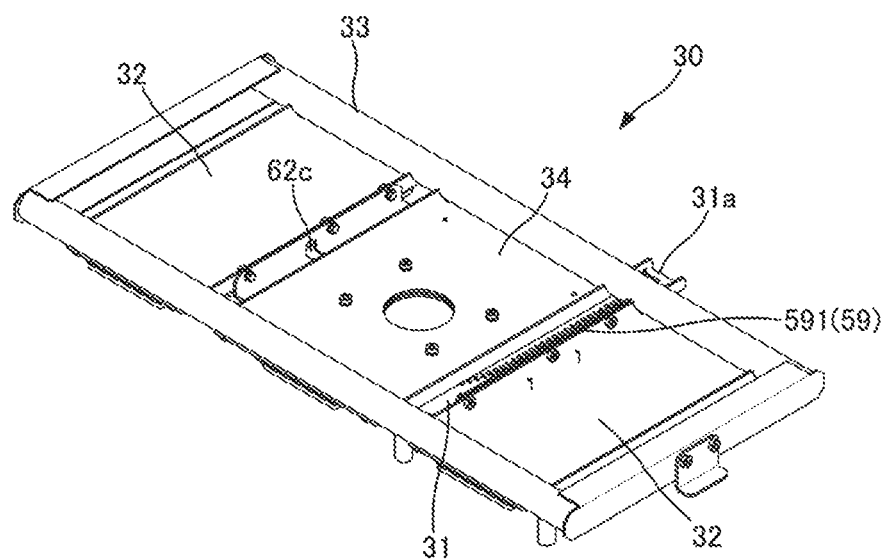
FIG. 10 is a perspective view showing the underframe of the seat device according to the embodiment of the present invention.

As shown in FIG. 1, the seat is attached to the underframe 30, and the underframe 30 is supported by the rotation mechanism 40. The underframe 30 is formed by combining frame members into a framework shape that corresponds to a bottom surface of the seating portion of the seat. To be more specific, as shown in FIG. 4 and FIG. 9, the underframe 30 is formed by a rotary seat plate 31 arranged above the rotation mechanism 40, a pair of side plates 32 and 32 connected to both sides of the rotary seat plate 31 so as to be aligned in a horizontal plane, and a rectangular framework frame 33 surrounding them. Additionally, a cover plate 34 is attached to an upper surface side of the rotary seat plate 31.

A bottom surface side of the rotary seat plate 31 is integrally and fixedly installed to the inner turntable 42 of the rotation mechanism 40. Thus, the seat on the underframe 30 is rotatably supported by the movable stand 20 via the rotation mechanism 40. To be more specific, the rotary seat plate 31 has a substantially rectangular shape including an area that is spread in a predetermined radius from the rotation axis of the seat, and an extending portion 31a projecting outward at right angle from one long side of the framework frame 33 is formed in one corner of the rotary seat plate 31. Many holes 59, 59 . . . , serving as transmission means of the drive mechanisms 50, which will be described next, are drilled in such a rotary seat plate 31.

<Drive Mechanism 50>

As shown in FIG. 1, the drive mechanism 50 sequentially and directly drives each of the sliding mechanism 14 and the rotation mechanism 40 (refer to FIG. 6). The drive mechanism 50 includes a motor 51, which is a power source, and transmission means for directly driving the sliding mechanism 14 first, and then directly driving the rotation mechanism 40 in a process of converting the state of the seat with power of the motor 51. Here, the process of converting the state of the seat corresponds to a process of converting from the long state into the cross state in the present embodiment.

Figure 12:
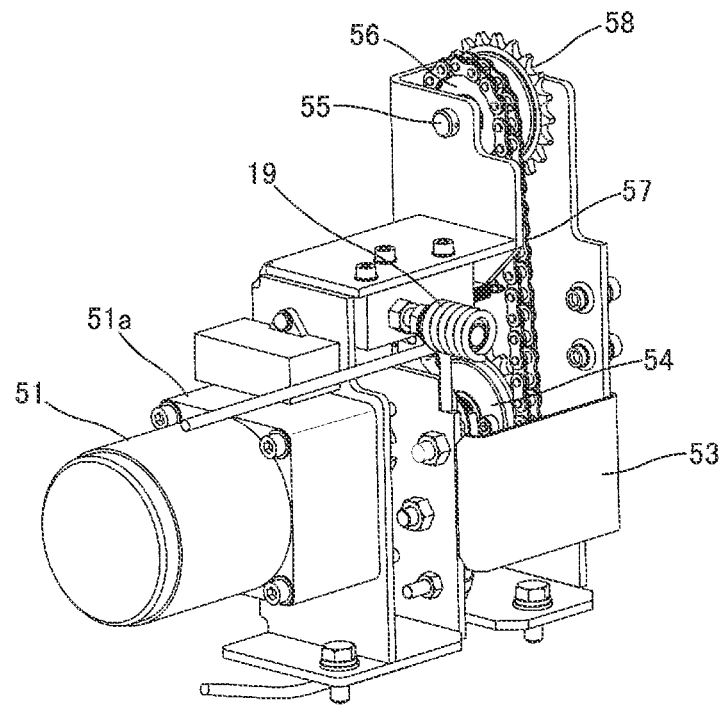
FIG. 12 is a perspective view showing a motor side of a drive mechanisms of the seat device according to the embodiment of the present invention.
Figure 13:
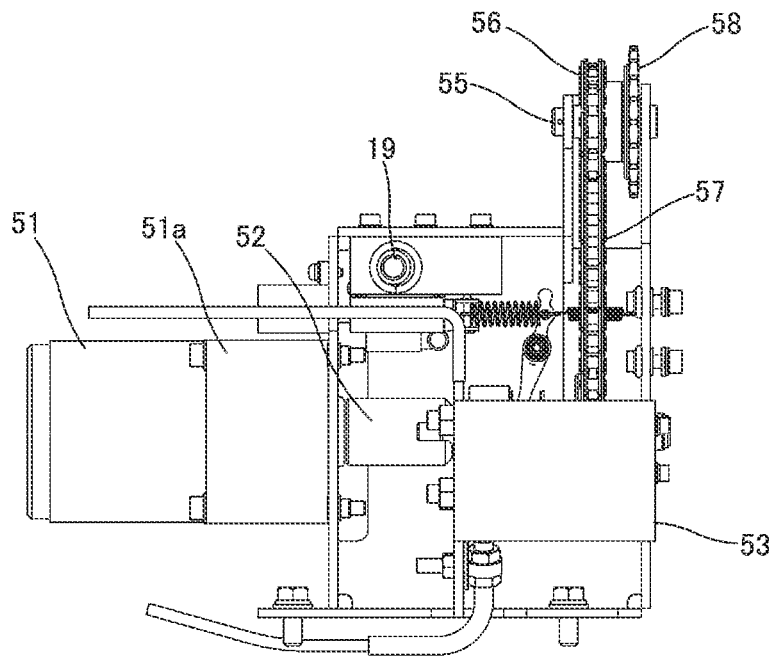
FIG. 13 is a front view showing the motor side of the drive mechanisms of the seat device according to the embodiment of the present invention.

The motor 51 is a common electric motor, and is an example of the "power source" of the present invention. To be more specific, as shown in FIG. 12 and FIG. 13, the motor 51 is combined in advance with a gearbox 51a including a built-in reduction mechanism, and is integrally fixed to a housing 53. A driving gear 54 is fixed to an output axis 52 on the motor 51 side via a clutch (not shown) within the housing 53.

A transmission shaft 55, which is arranged to be isolated from and parallel to the output axis 52, is pivotally supported in an upper portion of the housing 53, and a driven gear 56 is fixed to the transmission shaft 55. Here, the driving gear 54 and the driven gear 56 are connected to each other so as to be able to transmit torque via a chain 57 laid between them. Further, a sprocket 58 coaxially aligned with the driven gear 56 is fixed to the transmission shaft 55.

Each part, such as the motor 51, of the drive mechanism 50 arranged in the leg stand 11, which is the fixed side of the seat, is all incorporated into the housing 53 to be configured as a unit. As shown in FIG. 6, the housing 53 is disposed inside the leg stand 11, in the front side (aisle side) where the upper surface side is opened. Here, an upper side of the sprocket 58 exposed from an upper portion of the housing 53 is aligned parallel to the longitudinal direction of the leg stand 11 in one end of the front side of the upper surface of the leg stand 11, and is exposed from the upper surface side of the leg stand 11. Note that, although described later, the stopper 19 (refer to FIG. 5) for regulating the advance and retract range of the underframe 30 is also provided on an outer wall of the housing 53.

<<Transmission Means of Drive Mechanism 50>>

The transmission means of the drive mechanism 50 includes the sprocket 58, and the many holes 59, 59 . . . , which are provided in the underframe 30 that is the movable side of the seat, and to which power is transmitted by being rotatably engaged with the sprocket 58. To be more specific, the many holes 59, 59 . . . include a hole group 591 for advancement and retraction aligned in a line for driving the sliding mechanism 14, and a hole group 592 for rotation succeeding the hole group 591 for advancement and retraction, and aligned in an arc concentric with the rotation axis of the seat for driving the rotation mechanism 40.

Figure 11:
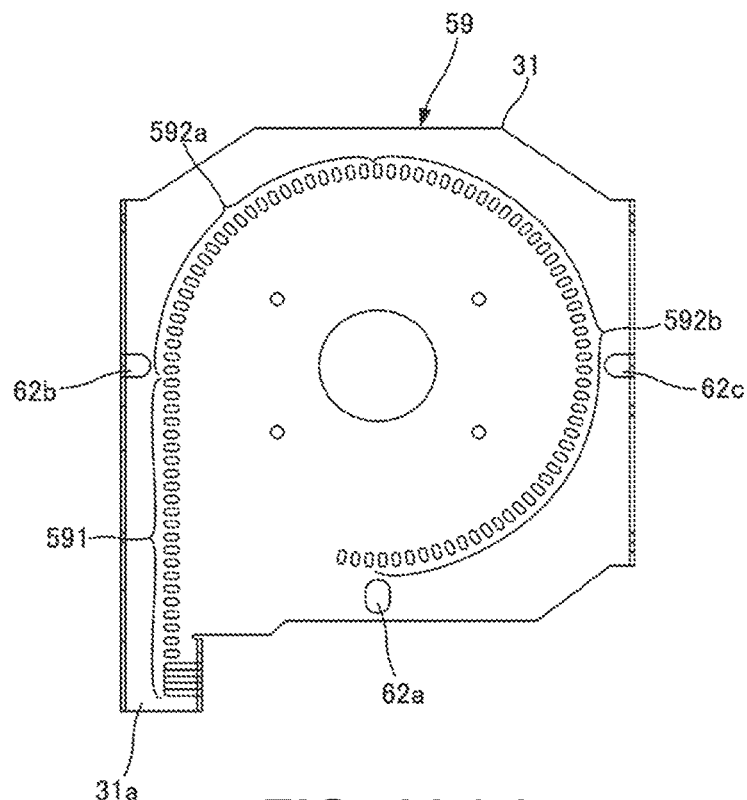
FIG. 11(a) is a plan view.
FIG. 11(b) is a right side view.
FIG. 11(c) is a front view showing a rotary seat plate of the underframe of the seat device according to the embodiment of the present invention.
Figure 11:
Figure 11:
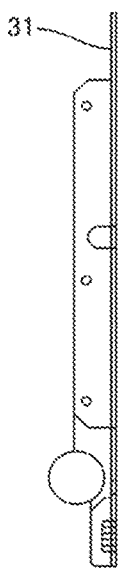

As shown in FIG. 11, the hole group 591 for advancement and retraction and the hole group 592 for rotation are provided in the rotary seat plate 31 of the underframe 30. The hole group 591 for advancement and retraction begin from the extending portion 31a in the one corner of the rotary seat plate 31, and continue to near the center of a vertical width of the rotary seat plate 31, and each hole 59 is successively provided at predetermined dense intervals along a straight line parallel to a short side of the framework frame 33. The hole group 591 for advancement and retraction is a portion that is engaged with the sprocket 58 to advance the seat parallel to the long state from the long state to a position that does not interfere with the wall A even when the seat is rotated.

On the other hand, the hole group 592 for rotation directly continues after the end of the hole group 591 for advancement and retraction, and each hole 59 is successively provided at predetermined dense intervals along the arc concentric with the rotation axis of the seat. Here, the curvature of the hole group 592 for rotation is set within a range with which the sprocket 58 is rotatably engaged. To be more specific, the hole group 592 for rotation extend to a rotation angle at which the seat is rotated to 270 degrees, hole group 592a for rotation in the range from 0 degrees, which is the beginning following the end of the hole group 591 for advancement and retraction, to 90 degrees are portions that rotate the seat to the one cross state, and the hole group 592b for rotation in the range from 90 degrees to 270 degrees are portions that rotate the seat from the cross state to the reverse cross.

When the seat is in the long state, and the sprocket 58 is rotated by the motor 51, the many holes 59, 59 . . . are sequentially moved. Therefore, first, the sliding mechanism 14 is directly driven, and subsequently, the rotation mechanism 40 is directly driven by the power of the motor 51. That is, the conversion of the seat from the long state to the one cross state, and the conversion from the one cross state to the reverse cross state are performed by the forward rotation of the motor 51. On the other hand, the conversion of the seat from the reverse cross state to the one cross state, and the conversion from the one cross state to the long state are set to be performed by the reverse rotation of the motor 51. Note that the rotation mechanism 40 also allows the seat to be manually rotated.

However, in the cabin of the railroad car, the seat devices are arranged along the wall A on both sides of the moving direction, so as to be aligned side by side in each row, and the space between both rows serves as an aisle. Thus, in the seat devices 10 of both rows, the shapes of the hole group 591 for advancement and retraction in the rotary seat plate 31 and the hole group 592 for rotation will be provided so as to be symmetrical to each other. In this case, the forward rotation of the seat in the seat device 10 on one wall A side is the reverse rotation of the seat in the seat device 10 on the other wall A side.

<Rotation Lock Mechanism 60>

The seat device 10 includes a rotation lock mechanism 60 that unrotatably restrains the underframe 30 (seat) in each rotation position of the long state, the one cross state, and the reverse cross state. The rotation lock mechanism 60 unrotatably restrains the underframe 30 to the movable stand 20, and in addition to this, also includes the advancement and retraction lock mechanism 70, which will be described later, in order to restrain the movable stand 20 to the leg stand 11, which is the fixed side of the seat, so as not to be able to advance and retract.

As shown in FIG. 6, and FIG. 1 to FIG. 3, the rotation lock mechanism 60 includes a lock pin 61 that can protrude up and down from the movable stand 20 side to the underframe 30 (refer to FIG. 1), and locking holes 62a, 62b, and 62c that are provided in the underframe 30, and with and from which the lock pin 61 is engaged and released. As shown in FIG. 9 and FIG. 11, a total of three locking holes 62a, 62b, and 62c are provided in the substantially center of a front end edge of the rotary seat plate 31 of the underframe 30 from which the extending portion 31a projects at right angle, and in the substantially center of both side end edges, respectively.

Figure 14:
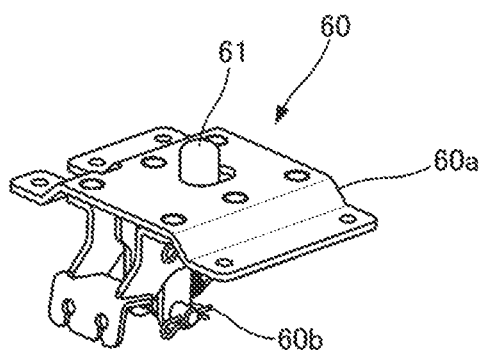
FIG. 14 is a perspective view showing a rotation lock mechanism of the seat device according to the embodiment of the present invention.
Figure 15:
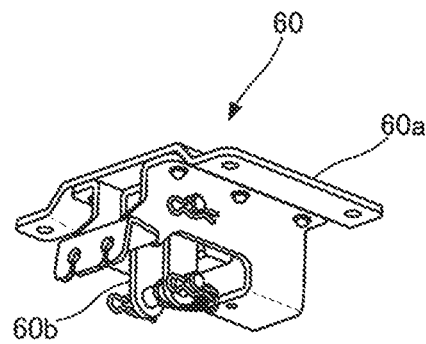
FIG. 15 is a perspective view showing a state where the rotation lock mechanism of the seat device according to the embodiment of the present invention is seen from the bottom.

As shown in FIG. 14 and FIG. 15, the lock pin 61 is incorporated in a unit 60a. As shown in FIG. 6, the unit 60a is fixed to the front end side of the movable stand 20 (around the notch 23 in FIG. 7). The lock pin 61 is operated between a lock position at which the lock pin 61 projects upward to fit into the locking holes 62a, 62b, and 62c, and a lock release position at which the lock pin 61 retracts downward to be released from the locking holes 62a, 62b, and 62c.

When the seat is converted into the long state, the one cross state, and the reverse cross state, the lock pin 61 restrains the seat by fitting into the locking holes 62a, 62b, and 62c on the underframe 30 side to which the lock pin 61 vertically corresponds at the respective positions. That is, in the long state shown in FIG. 1, the lock pin 61 fits into the locking hole 62a in the front end edge of the rotary seat plate 31. Additionally, in the one cross state shown in FIG. 2, the lock pin 61 fits into the locking hole 62b in one side end edge of the rotary seat plate 31. Further, in the reverse cross state shown in FIG. 3, the lock pin 61 fits into the locking hole 62c in the other side end edge of the rotary seat plate 31.

The unit 60a in which the lock pin 61 is incorporated is provided with each of a spring member (not shown) that always urges the lock pin 61 to project upward to the lock position, and a link 60b that makes the lock pin 61 resist the biasing force of the spring member to retract to the downward lock release position. Here, although an illustration is omitted, respective cables for electric operation and for manual operation are connected to the link 60b.

The lock pin 61 is configured to be normally maintained in the lock position by the biasing force of the spring member, but to retract to the lock release position against the biasing force of the spring member, when the link 60b is pulled by each cable. Here, the other end of the cable for manual operation is connected to a step pedal (not shown) provided in, for example, the leg stand 11 side, and the cable is pulled by an operation of stepping on the step pedal, and the restraint of the rotation lock mechanism 60 can be released.

On the other hand, for example, the motor 51 of the drive mechanism 50 also serves as the power source for pulling the cable for electric operation. The output axis 52 of the motor 51 described above includes a clutch, and by switching of the clutch, it is configured to be able to switch between a power system for directly driving the sliding mechanism 14 and the rotation mechanism 40, and an operation for retracting the lock pin 61 to release the restraint. That is, two operations, i.e., the conversion of the state of the seat and releasing the lock, can be performed by one motor 51. Note that a detailed description of the clutch of the motor 51 is omitted, since the configuration regarding the clutch of the motor 51 is common.

The rotation lock mechanism 60 according to the present embodiment is configured such that, when the seat is in the long state, the restraint by the rotation lock mechanism 60 cannot be released by the manual operation, that is, the operation of stepping on the step pedal, and can be released only by an electric operation by the motor 51 via the cable for electric operation. Here, the electric operation is performed by a crew or station employee of a vehicle, and the manual operation is mainly performed by a passenger.

Additionally as a configuration for disabling the lock release operation of the rotation lock mechanism 60 when the seat is in the long state, specifically, for example, it is conceivable to provide a difference between the electric operation and the manual operation for the stroke of the lock pin 61 from the lock position to the release position, or to house the step pedal in an inoperable manner when the seat is in the long state, etc.

<Advancement and Retraction Lock Mechanism 70>

The seat device 10 includes the advancement and retraction lock mechanism 70 that restrains the movable stand 20 to disable advancement and retraction in a retracted position where the movable stand 20 is most retracted (close) to the wall A side when the seat is in the long state, and in an advanced position where the movable stand 20 is most advanced to the aisle side when the seat is in the cross state. The advancement and retraction lock mechanism 70 restrains the movable stand 20 to the leg stand 11 to disable advancement and retraction, separately from the rotation lock mechanism 60. With the advancement and retraction lock mechanism 70, it becomes possible to restrain only the advancement and retraction of the seat, even in a state where the restraint of the rotation lock mechanism 60 is released.

Figure 16:
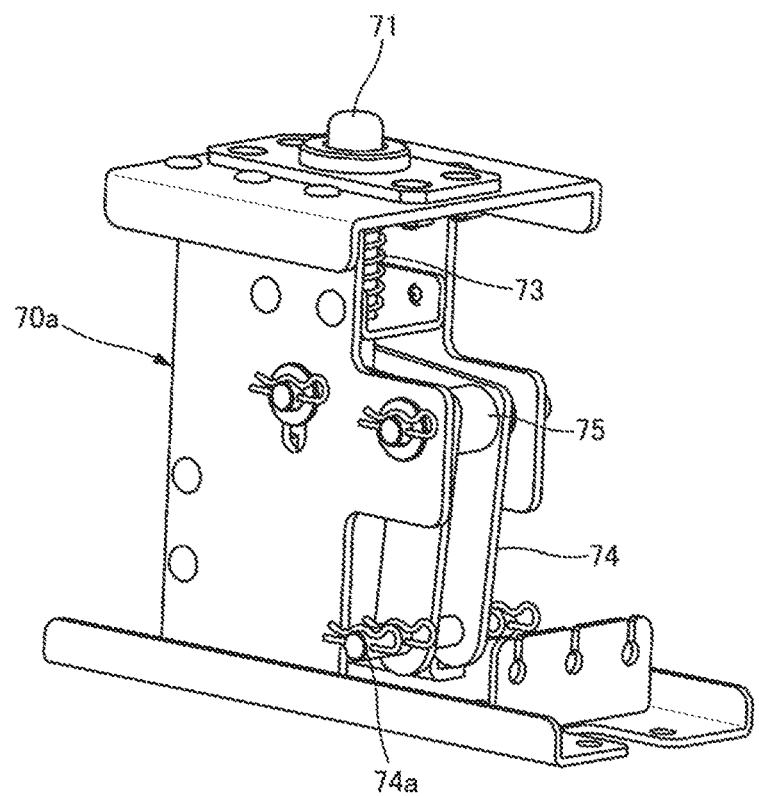
FIG. 16 is a perspective view showing an advancement and retraction lock mechanism of the seat device according to the embodiment of the present invention.

As shown in FIG. 1, FIG. 16, and FIG. 8, the advancement and retraction lock mechanism 70 includes a lock pin 71 that can protrude up and down from the leg stand 11 side to the movable stand 20, and locking holes 72a and 72b that are provided in the movable stand 20, and with and from which the lock pin 71 is engaged and released. As shown in FIG. 8, a total of two locking holes 72a and 72b are provided in front and back ends of the frame member 24 extending in the front and back directions in the rear lower side of the movable stand 20, respectively.

Figure 5:
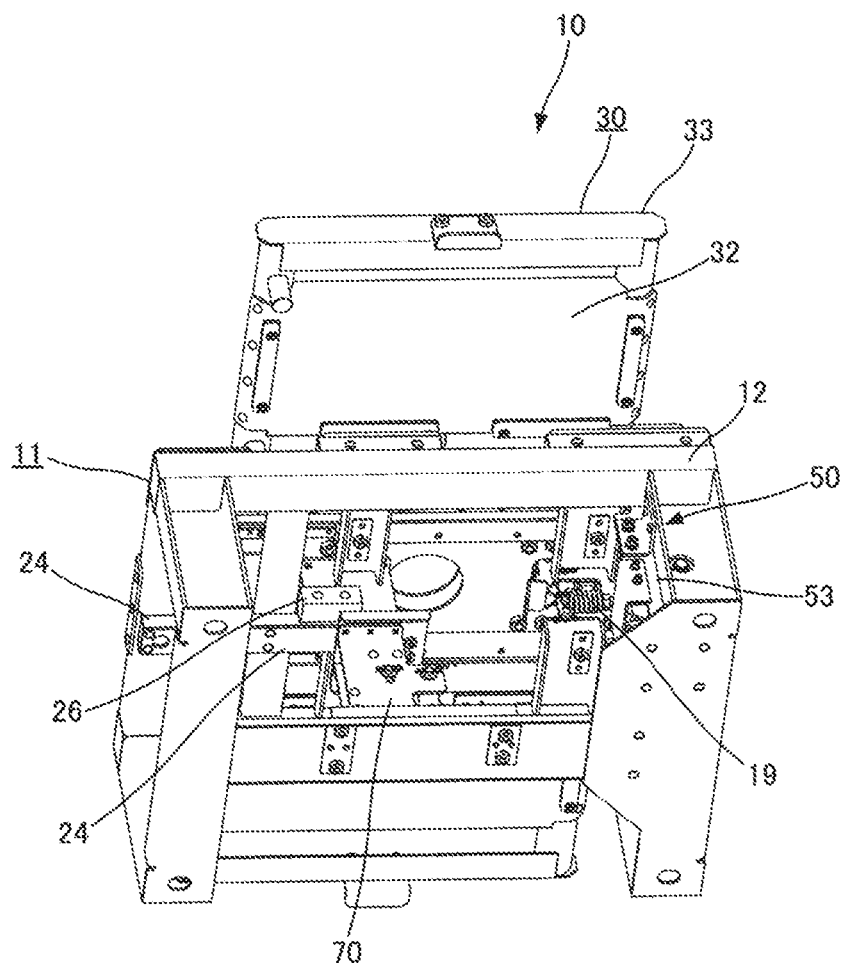
FIG. 5 is a perspective view showing a state where the seat device according to the embodiment of the present invention is seen from the bottom.
Figure 17:
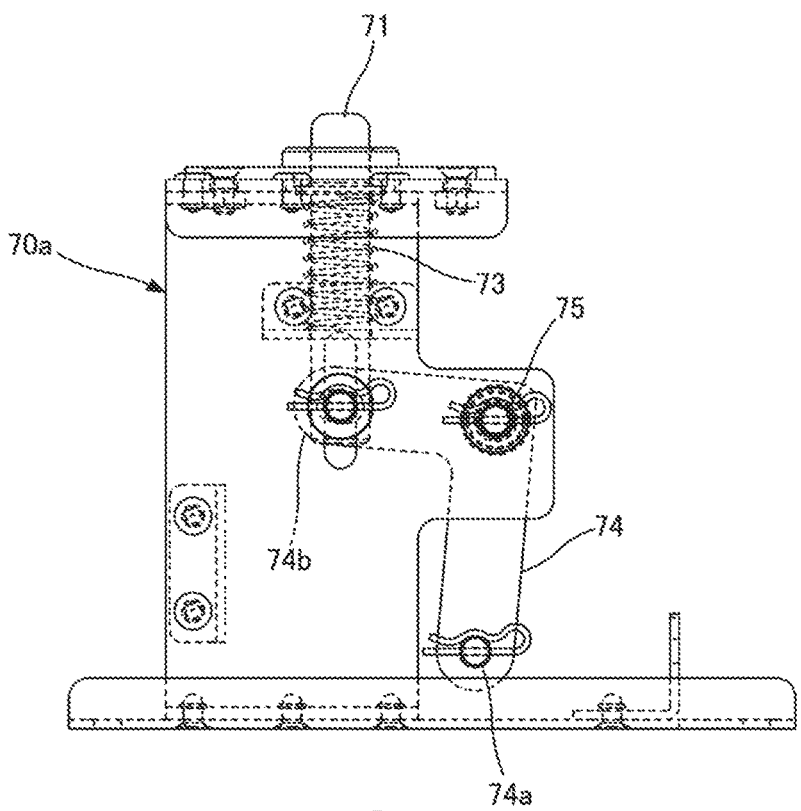
FIG. 17 is a front view showing the advancement and retraction lock mechanism of the seat device according to the embodiment of the present invention.

As shown in FIG. 16 and FIG. 17, the lock pin 71 is incorporated in a unit 70a. As shown in FIG. 1 and FIG. 5, the unit 70a is fixed inside the leg stand 11 located below the movable stand 20. The lock pin 71 is operated between a lock position at which the lock pin 71 projects upward to fit into the locking holes 72a and 72b, and a lock release position at which the lock pin 71 retracts downward to be released from the locking holes 72a and 72b.

When the seat is converted into the long state or the cross state, the lock pin 71 restrains the seat by fitting into the locking holes 72a and 72b on the movable stand 20 side to which the lock pin 71 vertically corresponds at the respective positions. That is, in the long state shown in FIG. 1, the lock pin 71 fits into the locking hole 72a in the front end side of the frame member 24. Additionally, in the one cross state shown in FIG. 2, the lock pin 71 fits into the locking hole 72b in the rear end side of the frame member 24. Similarly, also in the reverse cross state shown in FIG. 3, the lock pin 71 fits into the locking hole 72b.

As shown in FIG. 16 and FIG. 17, in the unit 70a, the lock pin 71 is always urged by a spring member 73 to protrude upward to be in the locking position. A link 74 for displacing the lock pin 71 to the downward release position against the biasing force of the spring member 73 is connected to the lock pin 71. Here, in the link 74, one end 74b extending laterally from an axis 75, which is the rotation center, is connected to a lower end side of the lock pin 71 so as to be able to be pushed and pulled, and the other end 74a extending downward from the axis 75 is configured to be able to be pushed and pulled by a power source such as a solenoid, an illustration of which is omitted.

That is, the lock pin 71 is normally maintained in the lock position by the biasing force of the spring member 73, but is displaced to the lock release position against the biasing force of the spring member 73, when the other end 74a of the link 74 is pulled by driving means. Thus, different from the case of the lock pin 61 of the rotation lock mechanism 60, the lock pin 71 is operated only by the electric operation, and the restraint cannot be released by the manual operation. Note that an emergency manual operation portion may be separately provided in each of the rotation lock mechanism 60 and the advancement and retraction lock mechanism 70, so that the restraint can be released in case of emergency such as power outage, irrespective of the state of the seat.

<Various Stoppers>

As shown in FIG. 6, in one corner of the rear end side in the upper surface side of the leg stand 11, the stopper 16 for preventing retraction of the seat when the seat is in the long state is provided. The stopper 16 is configured into a spring-like shape, and regulates the underframe 30 from retracting further to the wall A side by engaging with a pin-shaped engaged portion 35 (refer to FIG. 9) provided in the bottom surface side of the underframe 30, when the seat is in the long state.

On the other hand, as shown in FIG. 5, the stopper 19 for preventing advancement of the seat when the seat is in the cross state is provided in the outer wall of the housing 53 inside the leg stand 11. The stopper 19 is configured into a spring-like shape, and regulates the underframe 30 from advancing further to the aisle side by engaging with the block-shaped engaged portion 26 provided in the frame member 24 of the movable stand 20 side, when the seat is in the cross state.

Additionally, as shown in FIG. 6, the stopper 17 for preventing rotation of the seat when the seat is in the reverse cross state is also provided in one side end near the rear end in the upper surface of the leg stand 11. The stopper 17 is configured as a damper, and regulates the underframe 30 from rotating equal to or more than 270 degrees by engaging with a pin-shaped engaged portion 36 (refer to FIG. 9) provided in the bottom surface side of the underframe 30, when the seat is in the reverse cross state.

<Operation of Seat Device 10>

Figure 18:
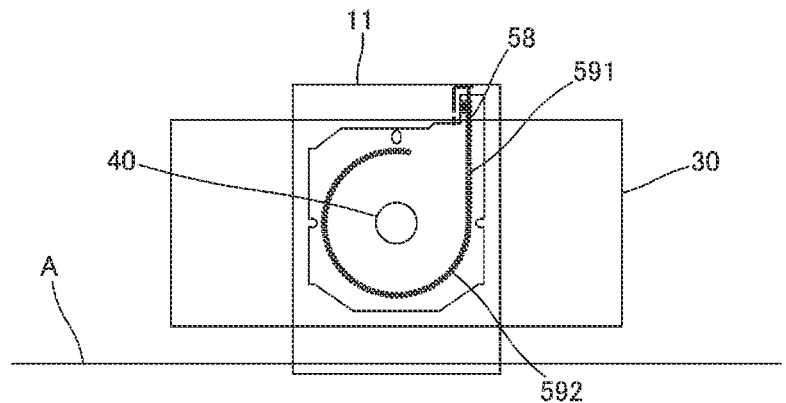
FIG. 18 is an explanatory diagram showing a former half process for converting a seat from the long state to the one cross state in the seat device according to the embodiment of the present invention.
Figure 18:
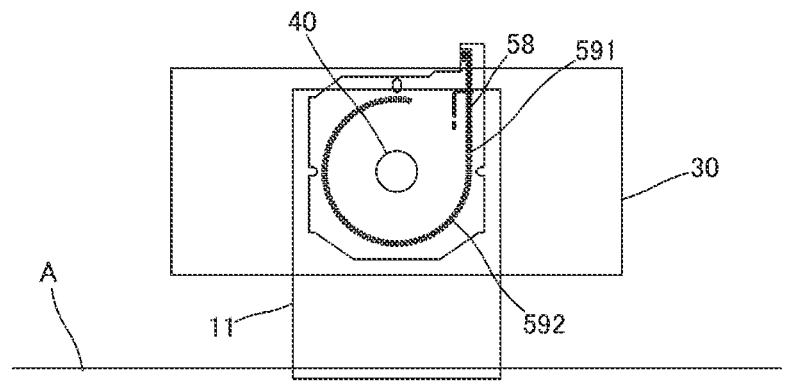
Figure 18:
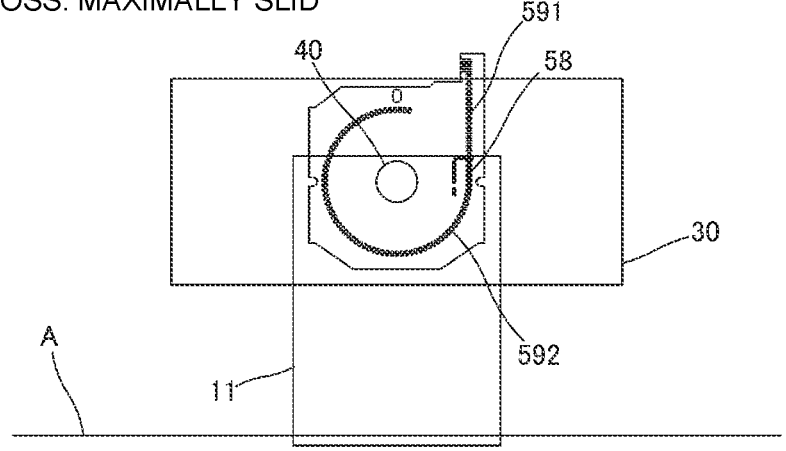

Hereinafter, based on FIG. 18 to FIG. 21, the operation of converting the state of the seat will be described. As shown in FIG. 18 (a), when the seat is in the long state, the underframe 30 is in a retracted position (an early stage of sliding) where the underframe 30 is most retracted (close) to the wall A side. Additionally, the long side of the underframe 30 (the back of the seat) is substantially parallel to and along the wall A, and the rotation angle is 0 degrees. At this time, in the drive mechanism 50, the teeth of the sprocket 58 are engaged with the beginning side of the hole group 591 for advancement and retraction, which begin from the extending portion 31a of the rotary seat plate 31 of the underframe 30 shown in FIG. 11.

Additionally, when the seat is in the long state, the underframe 30 of the seat is restrained together with the movable stand 20 to disable the advancement and retraction with respect to the leg stand 11 by the advancement and retraction lock mechanism 70. That is, the lock pin 71 of the advancement and retraction lock mechanism 70 shown in FIG. 16 fits into the locking hole 72a (refer to FIG. 8) in the front end side of the frame member 24 of the movable stand 20 side. Additionally, the pin-shaped engaged portion 35 (refer to FIG. 9) in the bottom surface side of the underframe 30 is engaged with the spring-like stopper 16 (refer to FIG. 6) in the upper surface side of the leg stand 11.

Further, the underframe 30 of the seat is unrotatably restrained with respect to the movable stand 20 by the rotation lock mechanism 60. That is, the lock pin 61 of the rotation lock mechanism 60 shown in FIG. 14 fits into the locking hole 62a (refer to FIG. 9) in the front end edge of the rotary seat plate 31 of the underframe 30. According to the above, the seat can be reliably held in the long state shown in FIG. 1.

<<From Long State to One Cross State>>

In order to convert the seat from the long state (the rotation angle 0 degrees) into the one cross state (the rotation angle 90 degrees), in the long state (the rotation angle 0 degrees) shown in FIG. 18 (a), first, the restraint of the advancement and retraction lock mechanism 70 is released. Then, the underframe 30 is slightly advanced and shifted together with the movable stand 20 to the aisle side (upward in FIG. 18 (a)) by the biasing force of the spring-like stopper 16 in the upper surface side of the leg stand 11. Accordingly, not only an initial operation is supported, but also it is possible to prevent the lock pin 71, for which lock is temporarily released, from fitting into the locking hole 72*a* again. Note that the lock of the advancement and retraction lock mechanism 70 can be released only by the electric operation.

Then, when the motor 51 of the drive mechanism 50 is driven to rotate forward, first, the sliding mechanism 14 is directly driven by the transmission means, and the underframe 30 is advanced to the aisle side together with the movable stand 20. That is, the sprocket 58 of the transmission means is rotationally driven by rotation of the motor 51, and the hole group 591 for advancement and retraction of the underframe 30 side with which the teeth of the sprocket 58 are engaged are moved to the aisle side in a linear direction that is orthogonal to the wall A. FIG. 18 (*b*) shows a middle position (the middle of sliding) where the underframe 30 is advanced from the aforementioned retracted position (the early stage of sliding) to the middle toward the aisle side. At this time, the teeth of the sprocket 58 are engaged with substantially the middle of the hole group 591 for advancement and retraction shown in FIG. 11.

Subsequently, by rotary drive of the sprocket 58, when the hole group 591 for advancement and retraction are further moved to the aisle side in the linear direction, as shown in FIG. 18 (*c*), the underframe 30 reaches an advanced position (is maximally slid) where the underframe 30 is most advanced to the aisle side. Then, since the engaged portion 26 in the movable stand 20 side is engaged with the spring-like stopper 19 inside the leg stand 11, the underframe 30 is regulated from advancing further to the aisle side. At this time, the teeth of the sprocket 58 are engaged with the end side of the hole group 591 for advancement and retraction shown in FIG. 11, that is, the vicinity of the boundary with the hole group 592 for rotation.

Additionally, when the underframe 30 reaches the advanced position (is maximally slid), the underframe 30 of the seat is restrained to the leg stand 11 together with the movable stand 20 by the advancement and retraction lock mechanism 70, so as not to be able to advance and retract. That is, the lock pin 71 of the advancement and retraction lock mechanism 70 shown in FIG. 16 fits into the locking hole 72*b* (refer to FIG. 8) in the rear end side of the frame member 24 of the movable stand 20 side.

Then, when the motor 51 of the drive mechanism 50 is driven to rotate forward, the rotation mechanism 40 is directly driven by the transmission means this time, and in FIG. 18 (*c*), the underframe 30 starts to be rotated in the counter clockwise direction in the figure about the rotation axis with respect to the leg stand 11 (the movable stand 20). That is, the sprocket 58 of the transmission means is rotationally driven by rotation of the motor 51, and the hole group 592 for rotation of the underframe 30 side with which the teeth of the sprocket 58 are engaged are moved in a circumferential direction about the rotation axis by the amount of the hole group 592*a* for rotation ranging from 0 degrees, which is their beginning, to 90 degrees.

Figure 19:
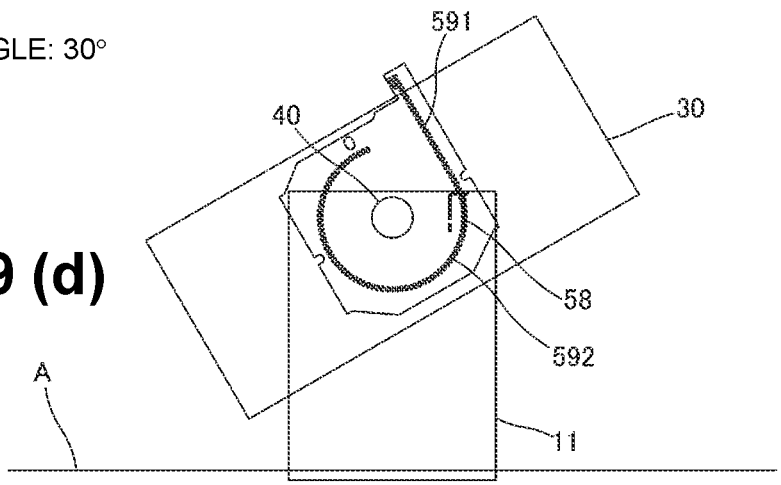
FIG. 19 is an explanatory diagram showing a latter half process for converting the seat from the long state to the one cross state in the seat device according to the embodiment of the present invention.
Figure 19:
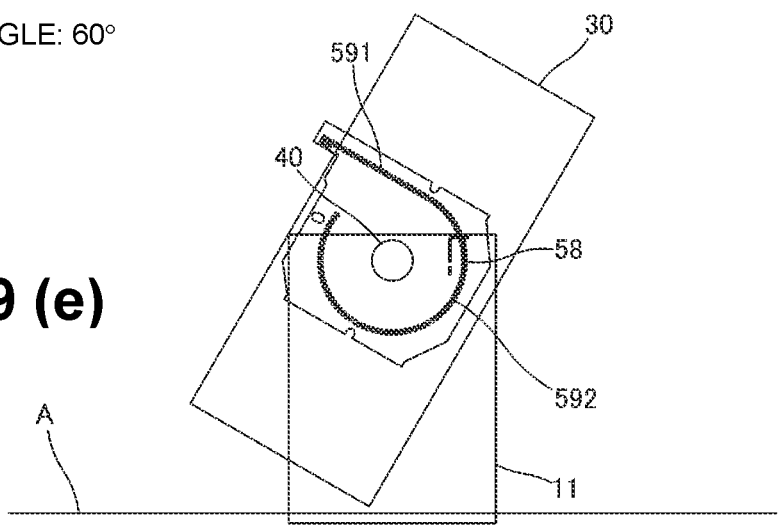
Figure 19:
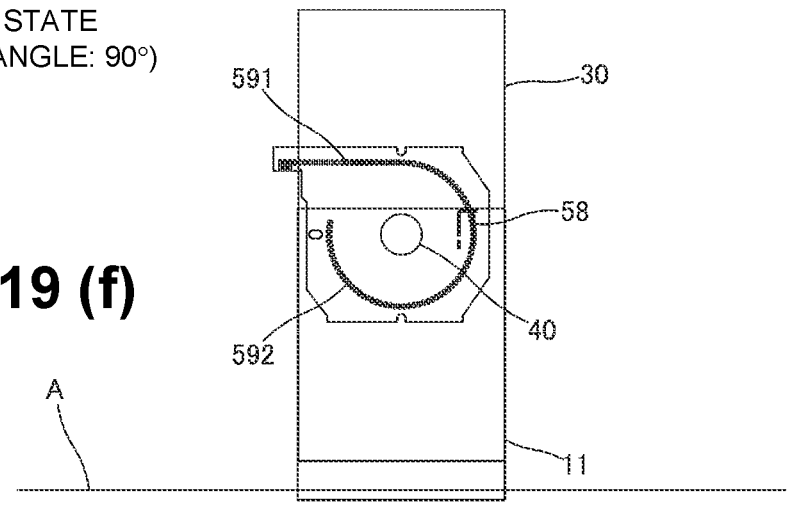

FIG. 19 (*d*) following FIG. 18 (*c*) shows a state where the rotation angle of the underframe 30 is 30 degrees, FIG. 19 (*e*) shows a state where the rotation angle of the underframe 30 is 60 degrees, and FIG. 19 (*f*) shows a state where the rotation angle of the underframe 30 reaches 90 degrees, i.e., the one cross state. When the underframe 30 is in the one cross state here, the teeth of the sprocket 58 are engaged with the end side of the hole group 592*a* for rotation of the hole group 592 for rotation.

In this manner, when the underframe 30 is rotated 90 degrees from the advanced position shown in FIG. 18 (*c*), it is necessary that the restraint of the underframe 30 by the rotation lock mechanism 60 is released. The timing for releasing the restraint of the rotation lock mechanism 60 may be, for example, a time point when the advanced position shown in FIG. 18 (*c*) is reached, or the restraint of the rotation lock mechanism 60 may be released in advance, before the underframe 30 starts advancing from the long state alternatively shown in FIG. 18 (*a*).

Then, when the underframe 30 is in the cross state, the underframe 30 is unrotatably restrained again with respect to the movable stand 20 by the rotation lock mechanism 60. That is, the lock pin 61 of the rotation lock mechanism 60 shown in FIG. 14 fits into the locking hole 62*b* (refer to FIG. 9) in one side end of the rotary seat plate 31 of the underframe 30. According to the above, the seat can be reliably held in the one cross state shown in FIG. 2.

<<From One Cross State to Reverse Cross State>>

In order to convert the seat from the one cross state into the reverse cross state, in the one cross state shown in FIG. 19 (*f*), first, the restraint of the rotation lock mechanism 60 is released. The operation for releasing the restraint here can be either the manual operation by a seated person, or the electric operation by the motor 51.

Then, when the motor 51 of the drive mechanism 50 is driven to rotate forward, the rotation mechanism 40 is directly driven by the transmission means, and in FIG. 19 (*f*), the underframe 30 starts to be rotated in the counter clockwise direction in the figure about the rotation axis with respect to the leg stand 11 (the movable stand 20). That is, the sprocket 58 of the transmission means is rotationally driven by rotation of the motor 51, and the hole group 592 for rotation (refer to FIG. 11) of the underframe 30 side with which the teeth of the sprocket 58 are engaged are moved in the circumferential direction about the rotation axis by the amount of hole group 592*b* for rotation ranging from 90 degrees to 270 degrees, which is their middle.

Figure 20:
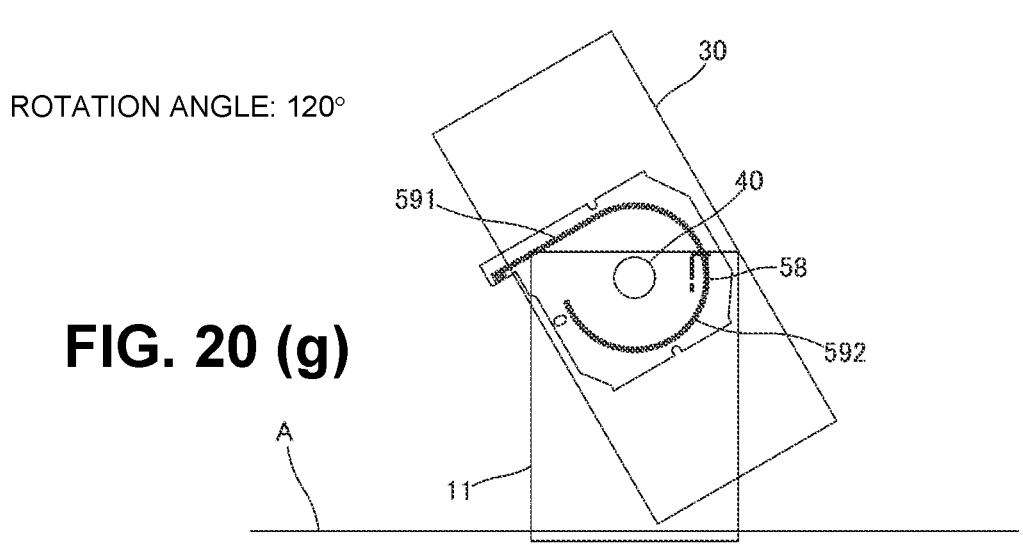
FIG. 20 is an explanatory diagram showing a former half process for converting the seat from the one cross state to the reverse cross state in the seat device according to the embodiment of the present invention.
Figure 20:
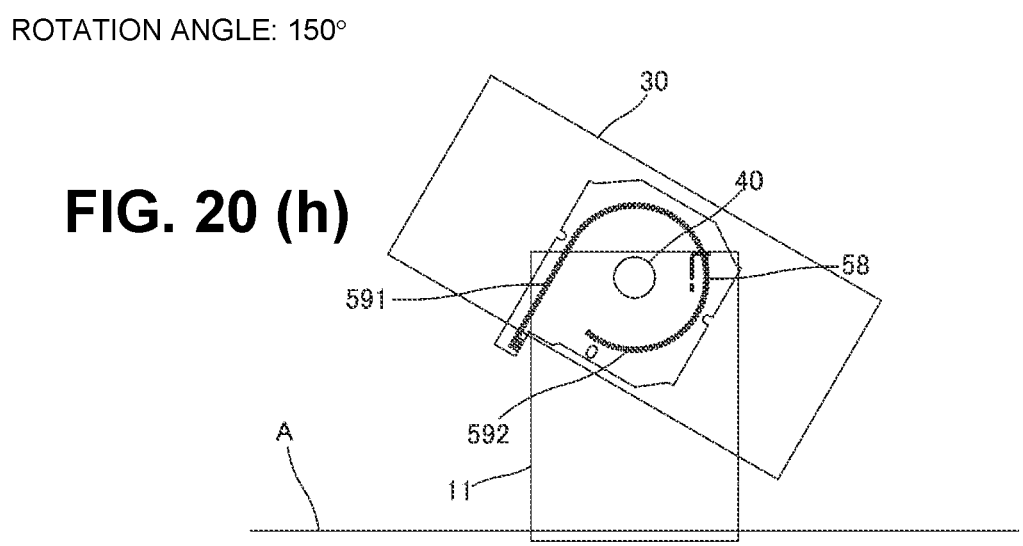
Figure 20:
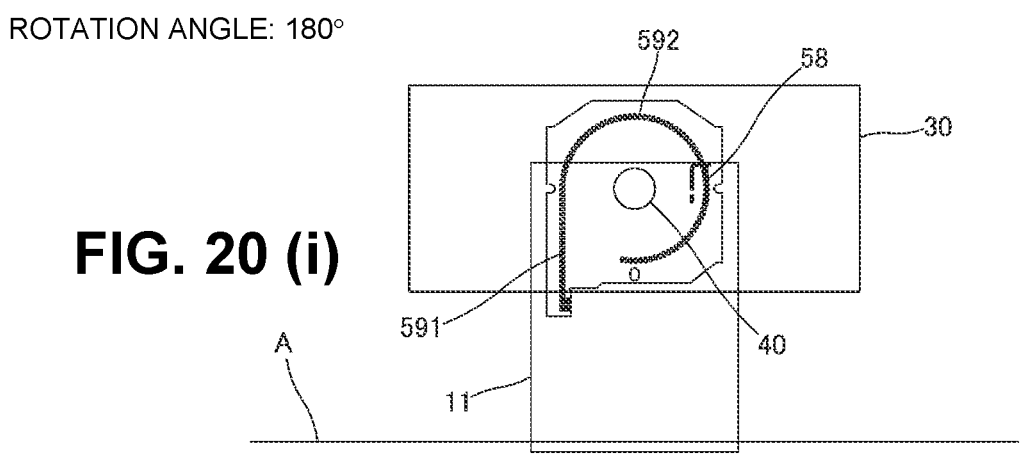

FIG. 20 (*g*) following FIG. 19 (*f*) shows a state where the rotation angle of the underframe 30 is 120 degrees, FIG. 20 (*h*) shows a state where the rotation angle of the underframe 30 is 150 degrees, and FIG. 20(*i*) shows a state where the rotation angle of the underframe 30 is 180 degrees. Here, when the rotation angle of the underframe 30 reaches 180 degrees, the teeth of the sprocket 58 are engaged with substantially the middle of the hole group 592*b* for rotation shown in FIG. 11.

Figure 21:
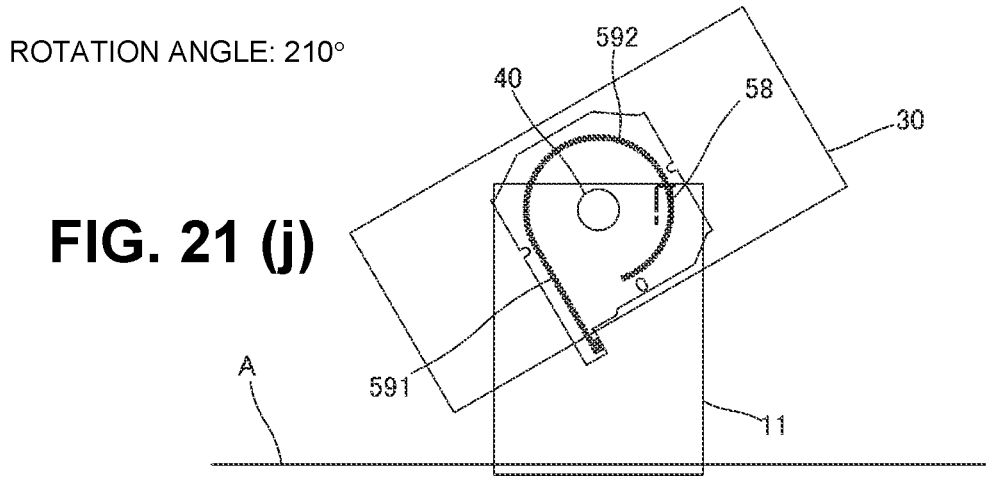
FIG. 21 is an explanatory diagram showing a latter half process for converting the seat from the one cross state to the reverse cross state in the seat device according to the embodiment of the present invention.
Figure 21:
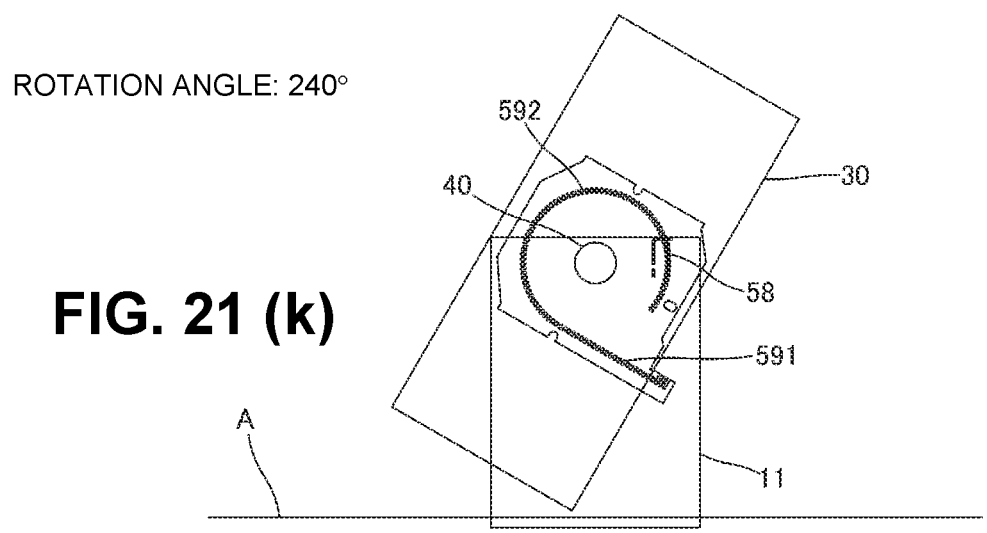
Figure 21:
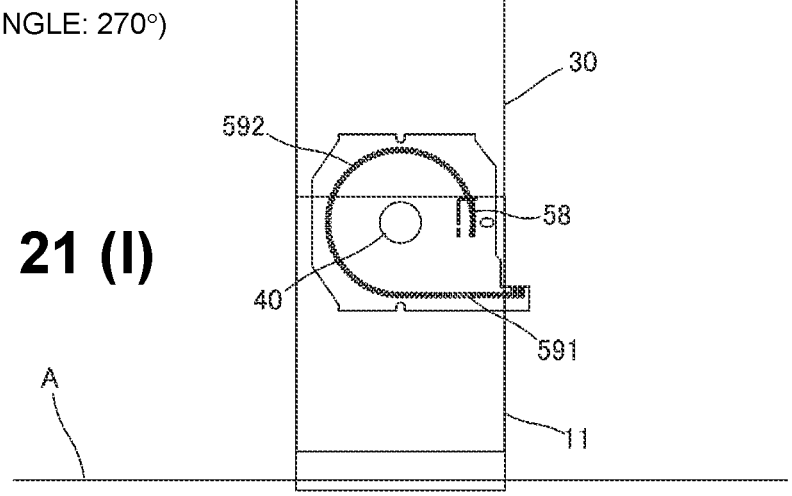

Subsequently, the underframe 30 is further rotated as it is by rotation of the sprocket 58, and FIG. 21 (*j*) shows a state where the rotation angle of the underframe 30 is 210 degrees, FIG. 21 (*k*) shows a state where the rotation angle of the underframe 30 is 240 degrees, and FIG. 21 (*l*) shows a state where the rotation angle of the underframe 30 reaches 270 degrees, i.e., the reverse cross state. Here, when the underframe 30 is in the reverse cross state, the teeth of the sprocket 58 are engaged with the end side of the hole group 592*b* for rotation shown in FIG. 11.

Then, when the underframe 30 is in the reverse cross state, the underframe 30 is unrotatably restrained again with respect to the movable stand 20 by the rotation lock mechanism 60. That is, the lock pin 61 of the rotation lock mechanism 60 shown in FIG. 14 fits into the locking hole 62*c* (refer to FIG. 9) in the other side of the rotary seat plate 31 of the underframe 30. According to the above, the seat can be reliably held in the reverse cross state shown in FIG. 3.

<<From Reverse Cross State to One Cross State>>

Additionally, when returning the seat from the reverse cross state to the one cross state, although a similar description is omitted, the opposite operation of the aforementioned operation is performed by reversely rotating the motor 51 this time, after the restraint by the rotation lock mechanism 60 is released. This operation can be performed not only by the electric operation by driving of the motor 51, but also by the manual operation.

<<From One Cross State to Long State>>

Further, when returning the seat from the one cross state to the original long state, although a similar description is omitted, the opposite operation of the aforementioned operation is performed by reversely rotating the motor 51, after releasing the restraint by the rotation lock mechanism 60, and also releasing the restraint by the advancement and retraction lock mechanism 70. This operation can be performed only by the electric operation by driving of the motor 51.

<Configuration and Effects of Present Invention>

Although the embodiment of the present invention has been described above, the present invention is not limited to the aforementioned embodiment. The present invention derived from the aforementioned embodiment will be described below.

First, the present invention is the seat device 10 that can convert the state of the seat, including the rotation mechanism 40 that rotates the seat about the rotation axis, the sliding mechanism 14 that advances and retracts the seat together with the rotation mechanism 40 from the fixed side, and the drive mechanism 50 that sequentially and directly drives each of the sliding mechanism 14 and the rotation mechanism 40 the drive mechanism 50 including the power source 51 provided in the fixed side of the seat, and the transmission means for directly driving the sliding mechanism 14 first, and then directly driving the rotation mechanism 40, in a process of converting the state of the seat with the power of the power source 51.

According to the seat device 10, for example, when rotating the seat near the wall A, it is possible to advance the seat away from the wall A first, and then to rotate the seat, so that the seat does not interfere with the wall A. Here, each of the sliding mechanism 14 and the rotation mechanism 40 is sequentially and directly driven by the drive mechanism 50, without interlocking the rotation of the seat with the advancement and retraction of the seat by a complicated transmission mechanism as in the related art.

Accordingly, the transmission mechanism having a complicated configuration and including a large number of parts is not required, and a series of operations that sequentially combines the advancement and retraction with rotation of the seat are enabled only with the drive mechanism 50. Thus, the configuration of the seat device 10 is simplified, and cost reduction becomes possible.

Additionally, by directly transmitting the power of the power source 51 not only to the rotation of the seat, but also to the advancement and retraction of the seat, there is no possibility that the transmission efficiency of power is impaired as in the case of indirectly utilizing the torque of a seat also for advancement and retraction, and the transmission efficiency of power can be significantly improved.

Additionally, in the present invention, the transmission means includes a sprocket (58) to be rotated by torque of a motor (51) that is the power source provided on the fixed side of the seat, and a plurality of holes (59) provided on a movable side of the seat so that the sprocket (58) is rotatably engaged with the holes to transmit the power, and the holes (59) are formed by a first hole group (591) for advancement and retraction aligned in a line for driving the sliding mechanism (14), and a second hole group (592) for rotation succeeding the first hole group (591) for advancement and retraction and aligned in an arc concentric with the rotation axis of the seat for driving the rotation mechanism (40).

In this manner, with the sprocket 58 having a simple configuration, and the many holes 59, the advancement and retraction and rotation of the seat can be sequentially and reliably operated. Particularly, the engagement between the sprocket 58 and the many holes 59 is always maintained on the entire trajectory along which the state of the seat is converted. Accordingly, the seat can be reliably supported in any states.

Additionally, in the present invention, the driving gear 54 is fixed to the output axis 52 of the motor 51, the driven gear 56 is fixed to the transmission shaft 55 that is arranged to be isolated from and parallel to the output axis 52, and the driving gear 54 and the driven gear 56 are connected to each other so as to be able to transmit torque via the chain 57 laid between them, and the sprocket 58 is fixed to the transmission shaft 55 in a state of being coaxially aligned with the driven gear 56.

Accordingly, in the drive mechanism 50, it becomes possible to arrange the motor 51, which is arranged in the fixed side of the seat and having a bulky configuration, and the sprocket 58, which is arranged as close as possible to the movable side of the seat, away from each other. Thus, the degree of freedom of the arrangement layout of the drive mechanism 50 in the fixed side of the seat is increased, the arrangement space is not unreasonably limited, and effective use of the dead space of the fixed side of the seat can also be achieved.

Additionally, the present invention includes, as the fixed side of the seat, the leg stand 11 fixed on the floor surface, as the movable side of the seat, the movable stand 20 supported by the leg stand 11 via the sliding mechanism 14 so as to be able to advance and retract, and the underframe 30 of the seat rotatably supported by the movable stand 20 via the rotation mechanism 40, wherein the motor 51 and the sprocket 58 are provided in the leg stand 11, and the upper side of the sprocket 58 is exposed from the upper surface side of the leg stand 11, and the many holes 59 are provided in the underframe 30 in the state where the upper teeth of the sprocket 58 are rotatably engaged with the many holes 59.

Accordingly, the optimum layout of the drive mechanism 50 can be realized among the minimum required components of the seat device 10.

Additionally, in the present invention, the state of the seat can be converted into the long state where the back of the seat is substantially parallel to and along the wall A, the one cross state where the back of the seat is separated from the wall A in the orientation substantially orthogonal to the long state, and the reverse cross state that is the opposite orientation of the one cross state, and the drive mechanism 50 directly drives the sliding mechanism 14 first, advances the movable stand 20 in the direction away from the wall A, and then directly drives the rotation mechanism 40 to rotate the underframe 30 forward substantially 90 degrees at the position where the movable stand 20 is away from the wall, in the process of converting the state of the seat from the long state into the one cross state.

Accordingly, the seat device 10 becomes possible to directly apply to general rotary seats mounted in railroad cars.

Further, in the present invention, the drive mechanism 50 directly drives the rotation mechanism 40 while the movable stand 20 is at the position away from the wall A to rotate the underframe 30 substantially 180 degrees forward, in the process converting the state of the seat from the one cross state into the reverse cross state.

Accordingly, in the process of sequentially converting the state of the seat into all of the orientations, i.e., the long state, the one cross state, and the reverse cross state, the rotation direction of the motor 51 can be unified, and the control related to the driving of this motor 51 can be facilitated.

Although the embodiments have been described above with the drawings, the specific configuration is not limited to these embodiments, and even when there are modification and addition in the scope not departing from the gist of the present invention, they are included in the present invention.

For example, the shapes of the leg stand 11, the movable stand 20, and the underframe 30 are not limited to those shown. Additionally, although the example of the seat for two persons has been described, the seat may be for three persons or one person. In addition, the conversion of the state of the seat is not limited to the long state, the one cross state, and the reverse cross state.

INDUSTRIAL APPLICABILITY

The present invention can be widely utilized as a seat device for chairs for theaters, home, and office, in addition to a seat for vehicles installed in cabins of railroad cars, airplanes, automobiles, marine vessels, etc.

REFERENCE SIGNS LIST

10 . . . seat device
11 . . . leg stand
14 . . . sliding mechanism
20 . . . movable stand
30 . . . underframe
40 . . . rotation mechanism
50 . . . drive mechanism
51 . . . motor
58 . . . sprocket
59 . . . many hole
591 . . . hole group for advancement and retraction
592 . . . hole group for rotation

What is claimed is:

1. A seat device that can convert a state of a seat, comprising:
a rotation mechanism that rotates the seat about a rotation axis;
a sliding mechanism that advances and retracts the seat together with the rotation mechanism from a fixed side; and
a drive mechanism that sequentially and directly drives each of the sliding mechanism and the rotation mechanism,
wherein the drive mechanism includes a power source provided in the fixed side of the seat, and transmission means for directly driving the sliding mechanism first, and then directly driving the rotation mechanism, in a process of converting the state of the seat with power of the power source.

2. The seat device according to claim 1, wherein the transmission means includes a sprocket to be rotated by torque of a motor that is the power source provided on the fixed side of the seat, and a plurality of holes provided on a movable side of the seat so that the sprocket is rotatably engaged with the holes to transmit the power, and
the holes are formed by a first hole group for advancement and retraction aligned in a line for driving the sliding mechanism, and a second hole group for rotation succeeding the first hole group for advancement and retraction and aligned in an arc concentric with the rotation axis of the seat for driving the rotation mechanism.

3. The seat device according to claim 2, wherein a driving gear is fixed to an output axis of the motor, a driven gear is fixed to a transmission shaft that is arranged to be isolated from and parallel to the output axis, and the driving gear and the driven gear are connected to each other so as to be able to transmit torque via a chain laid between them, and
the sprocket is fixed to the transmission shaft in a state of being coaxially aligned with the driven gear.

4. The seat device according to claim 3, further comprising:
a leg stand fixed on a floor surface as the fixed side of the seat;
a movable stand supported by the leg stand via the sliding mechanism so as to be able to advance and retract as the movable side of the seat; and
an underframe of the seat rotatably supported by the movable stand via the rotation mechanism,
wherein the motor and the sprocket are provided in the leg stand,
an upper side of the sprocket is exposed from an upper surface side of the leg stand, and
the many holes are provided in the underframe in a state where upper teeth of the sprocket are rotatably engaged with the many holes.

5. The seat device according to claim 1, wherein the state of the seat can be converted into a long state where a back of the seat is substantially parallel to and along a wall, one cross state where the back of the seat is separated from the wall in an orientation substantially orthogonal to the long state, and a reverse cross state that is an opposite orientation of the one cross state, and
the drive mechanism directly drives the sliding mechanism first, advances the movable stand in a direction away from the wall, and then directly drives the rotation mechanism to rotate the underframe forward substantially 90 degrees at a position where the movable stand is away from the wall, in the process of converting the state of the seat from the long state into the one cross state.

6. The seat device according to claim 5, wherein the drive mechanism directly drives the rotation mechanism while the movable stand is at a position away from the wall to rotate the underframe substantially 180 degrees forward, in a process of converting the state of the seat from the one cross state into the reverse cross state.

* * * * *